United States Patent
Pei et al.

(10) Patent No.: US 12,535,611 B1
(45) Date of Patent: Jan. 27, 2026

(54) ELECTROMAGNETIC DETECTION SYSTEM BASED ON SEA-BOTTOM CRAWLER

(71) Applicants: First Institute of Oceanography, Ministry of Natural Resources, Qingdao (CN); Qingdao Marine Science and Technology Center, Qingdao (CN)

(72) Inventors: Yanliang Pei, Qingdao (CN); Baohua Liu, Qingdao (CN); Shiji Song, Qingdao (CN); Xuefa Shi, Qingdao (CN); Qingfeng Hua, Qingdao (CN); Kai Chen, Qingdao (CN); Xianfeng Li, Qingdao (CN)

(73) Assignees: First Institute of Oceanography, Ministry of Natural Resources, Qingdao (CN); Qingdao Marine Science and Technology Center, Qingdao (CN)

( * ) Notice: Subject to any disclaimer, the term of this patent is extended or adjusted under 35 U.S.C. 154(b) by 0 days.

(21) Appl. No.: 19/245,207

(22) Filed: Jun. 20, 2025

(30) Foreign Application Priority Data

Dec. 5, 2024 (CN) .......................... 202411773687.2

(51) Int. Cl.
*G01V 3/17* (2006.01)
*G01V 3/12* (2006.01)
(Continued)

(52) U.S. Cl.
CPC .................. *G01V 3/17* (2013.01); *G01V 3/12* (2013.01); *G01V 3/36* (2013.01); *G01V 3/38* (2013.01)

(58) Field of Classification Search
CPC ... G01V 3/17; G01V 3/12; G01V 3/36; G01V 3/38
See application file for complete search history.

(56) References Cited

U.S. PATENT DOCUMENTS 8,265,913 B2 *  9/2012  MacGregor ............ G01V 3/083
                                                     703/2
8,928,324 B2 *  1/2015  Hobbs .................... G01V 3/083
                                                    324/334
(Continued)

FOREIGN PATENT DOCUMENTS

| CN | 107315199 A | 11/2017 |
| CN | 108008454 A | 5/2018 |
| CN | 118884563 A | 11/2024 |

OTHER PUBLICATIONS

Zhang et al. Advances in Marine Intelligent Electromagnetic Detection System, Technology, and Applications: (Year: 2023).*

*Primary Examiner* — Lina Cordero
*Assistant Examiner* — Lynda Dinh
(74) *Attorney, Agent, or Firm* — Nitin Kaushik

(57) ABSTRACT

The invention provides an electromagnetic detection system based on a sea-bottom crawler, belonging to the field of geophysical exploration technology, comprising: a survey vessel, a sea-bottom crawler, a transmitting antenna, a receiving node array, a control chip, and a power supply; the survey vessel is connected to the sea-bottom crawler through a traction rope, and the tail of the sea-bottom crawler is provided with a drag cable, on which the transmitting antenna and the receiving node array are mounted, and both the control chip and the power supply are configured in the integrated electronic cabin of the sea-bottom crawler; the power supply provides electrical energy to the sea-bottom crawler, transmitting antenna, receiving node array, and control chip, and the control chip is electrically connected to the transmitting antenna, the receiving node array, and the power system of the sea-bottom crawler; the control chip is configured to have an electromagnetic detection interference compensation module for performing interference elimination and compensation on reflected waves received by the (Continued)

receiving node array. It solves the technical problem of insufficient detection accuracy in existing technologies.

6 Claims, 3 Drawing Sheets

(51) Int. Cl.
    *G01V 3/36*           (2006.01)
    *G01V 3/38*           (2006.01)

(56) References Cited

U.S. PATENT DOCUMENTS

| | | | |
|---|---|---|---|
| 2008/0189042 A1* | 8/2008 | Lisitsyn | G01V 3/083 |
| | | | 702/11 |
| 2010/0194394 A1* | 8/2010 | Zhdanov | G01V 3/15 |
| | | | 324/330 |
| 2018/0239042 A1* | 8/2018 | Ware | G01V 1/22 |

* cited by examiner

ELECTROMAGNETIC DETECTION SYSTEM BASED ON SEA-BOTTOM CRAWLER

CROSS-REFERENCE TO RELATED APPLICATIONS

The application claims priority to Chinese patent application No. 2024117736872, filed on Dec. 5, 2024, the entire contents of which are incorporated herein by reference.

TECHNICAL FIELD

The present invention belongs to the field of geophysical exploration technology, and specifically relates to an electromagnetic detection system based on a sea-bottom crawler.

BACKGROUND

Electromagnetic wave detection technology is widely used in fields such as marine geological exploration and sea-bottom resource exploration. By emitting electromagnetic waves and receiving reflected waves, sea-bottom geological information can be obtained, providing important basis for marine resource exploration and development. The existing sea-bottom electromagnetic wave detection technologies mainly include the following four types:

(1) Technical method one: to use an independent ocean electromagnetic data acquisition station which is sank to the bottom, combined with a near-sea-surface towing or near-sea-bottom towing excitation source. Ocean bottom electromagnetic meters (OBEMs) have high cost, low operational efficiency, and high risk of loss. Each OBEM costs hundreds of thousands of RMB, and each test requires dozens of them. If higher data resolution is required, instrument density will be increased, the number of instruments used will be even larger, and the instrument cost will be higher.

(2) Technical method two: to use synchronous towing of ocean electromagnetic data acquisition cable and excitation cable. Sea surface towing is only suitable for working in shallow water areas. In deep water areas, the diffusion and attenuation of thick seawater result in an extremely low signal-to-noise ratio of electromagnetic response signals of sea-bottom sediments, making it impossible to operate in deep water areas. Moreover, this technical method can only collect one component of the electric field along the cable direction, without collecting any magnetic field component data. The type of data information is limited, which is disadvantageous for data processing and interpretation.

(3) Technical method three: to use both an ocean electromagnetic excitation source of near-sea-bottom deep towing and an ocean electromagnetic data acquisition node of near-sea-bottom deep towing. The technical solution of Scripps Institution of Oceanography in the United States (using one ship to tow both the deep towing excitation source and the deep towing collection node simultaneously) is difficult to operate, and it is challenging to tow multiple towing bodies with one cable, resulting in a high failure rate.

(4) Technical method four: to use an underwater towed electromagnetic detection technology, including an underwater towed launch power source and two pairs of electric field electrodes on the seafloor. The design of underwater passive towing technology is not suitable for working in areas with severe terrain fluctuations.

That is to say, for the existing underwater electromagnetic detection technologies, the propagation of electromagnetic waves is affected by various factors in the complex underwater environment, such as water depth, water temperature, salinity, and pose change of the sea-bottom crawler itself. These interference factors can cause serious distortion of reflected waves, thereby reducing the accuracy of electromagnetic detection.

SUMMARY

In view of the above, the present invention provides an electromagnetic detection system based on sea-bottom crawlers, which can solve the technical problem of insufficient detection accuracy caused by interference factors in the existing underwater electromagnetic detection technologies.

The present invention is achieved as follows:

The present invention provides an electromagnetic detection system based on a sea-bottom crawler, comprising: a survey vessel, a sea-bottom crawler, a transmitting antenna, a receiving node array, a control chip, and a power supply; wherein the survey vessel is connected to the sea-bottom crawler through a traction rope, and the tail of the sea-bottom crawler is provided with a drag cable, and on the drag cable, the transmitting antenna and the receiving node array are mounted, and both the control chip and the power supply are configured in the integrated electronic cabin of the sea-bottom crawler; wherein the power supply provides electrical energy to the sea-bottom crawler, transmitting antenna, receiving node array, and control chip, and the control chip is electrically connected to the transmitting antenna, the receiving node array, and the power system of the sea-bottom crawler; wherein an electromagnetic detection interference compensation device for performing interference elimination and compensation on reflected waves received by the receiving node array is performed by the control chip; wherein the control chip is configured to have a data transmission device for sending the compensated electromagnetic detection results to the survey vessel.

On the basis of the above technical solution, the electromagnetic detection system based on a sea-bottom crawler of the present invention can also be improved as follows:

Among these, the sea-bottom crawler therein adopts a tracked sea-bottom crawler.

Furthermore, the data transmission device sends the compensated electromagnetic detection results to the survey vessel through a data cable or wireless channel.

Among these, the receiving node array is specifically a linear or two-dimensional array composed of multiple electromagnetic induction coils, and each receiving node comprises three-axis orthogonal induction coils for receiving electromagnetic field signals from different directions.

The spacing between receiving nodes can be adjusted to accommodate different detection depths and resolution requirements; the receiving node array is in contact with the surface of sea floor.

Further, the transmitting antenna is a negative buoyancy antenna.

Further, the module of the sea-bottom crawler comprises at least a depth gauge and an altimeter.

Further, it also comprises an excitation source, which is attached to the sea-bottom crawler.

Further, the excitation source, specifically a dipole emitter composed of a pair of large-area electrode plates, can generate low-frequency alternating current to excite an electromagnetic field in the underwater medium.

The electrode plates of the excitation source are in direct contact with the seafloor surface. The electrode plates are made of special alloy material, which has good conductivity and corrosion resistance.

Further, the survey vessel is provided with a satellite navigation system, an underwater positioning system, and a power supply unit.

Among these, the integrated electronic cabin is a cabin formed inside the body of the sea-bottom crawler; the power supply supplies power to the transmitting antenna through an excitation source driving unit; the power supply supplies power to the receiving node array through a receiving node driving unit; specifically, the electronic cabin is provided with an excitation source driving unit and a receiving node driving unit; the excitation source driving unit is a high-power current transmission circuit for providing power to the transmitting antenna; the transmitting antenna is a negative buoyancy antenna; the receiving node driving unit is connected to the receiving node array.

Further, the integrated electronic cabin of the sea-bottom crawler is provided with a signal processing unit, an inertial measurement unit, a depth sensor, a temperature sensor, and a salinity sensor.

Further, the receiving node array and the sea-bottom crawler transmit real-time data; the status information and received electromagnetic data of the receiving node array are sent to the sea-bottom crawler in real time; the sea-bottom crawler records electromagnetic data; and the commands of the sea-bottom crawler are sent to the receiving node array in real time.

Optionally, there is a cable connection between the sea-bottom crawler body and the survey vessel; the electrical energy required by the sea-bottom crawler is transmitted by the survey vessel through a cable; real-time data transmission occurs between the sea-bottom crawler and the survey vessel; the status data and received electromagnetic data of the sea-bottom crawler are transmitted in real time to the survey vessel laboratory; and the commands of the survey vessel laboratory are sent in real time to the sea-bottom crawler.

Specifically, the step S10 includes: first controlling the sea-bottom crawler to crawl within a predetermined detection area; during the crawling process, the sea-bottom crawler will collect and record real-time underwater environmental parameters, including water depth, water temperature and salinity, while obtaining its own pose information such as position, posture, speed, acceleration, and the like. At the same time, the electromagnetic wave transmitter on the sea-bottom crawler will emit digitally modulated electromagnetic waves to a predetermined area, carrying digital information in the form of floating-point number sequences. The electromagnetic wave receiver on the sea-bottom crawler will capture the reflected waves generated by these emitted waves in the underwater environment.

The step S20 specifically includes: demodulating and digitizing the captured reflected wave signal, extracting the digital information carried in the reflected wave, and comparing and analyzing the digital information with the digital information in the emitted wave.

The step S30 specifically includes: first aligning the time of the emitted wave and the reflected wave, and then calculating the time delay, amplitude attenuation, and discrimination between the reflected wave and the emitted wave within each time window by using the sliding time window method. Among these, the definition of discrimination is 1 minus the similarity between the reflected wave and the emitted wave within the sliding time window.

The step S40 specifically includes: inputting the information obtained in steps S10 to S30, including the emitted wave, reflected wave, as well as the time delay, amplitude attenuation, and discrimination of each time window, into a pre-trained first reflected wave compensation model. This model adopts a neural network architecture with a multi-subnet structure; and after processing, a preliminary compensated reflected wave can be obtained, which is referred to as the first compensated reflected wave.

The step S50 specifically includes: aligning the underwater environmental parameters and pose information of the sea-bottom crawler obtained in step S10 with the emitted wave information in step S10 to ensure time synchronization among various types of information.

The step S60 specifically includes: calculating the correlation of the underwater environmental parameters and sea-bottom crawler pose information with the time delay, amplitude attenuation, and discrimination of each time window by using the Bayesian network method, and obtaining the degree of influence of various interference factors on the reflected waves.

The step S70 specifically includes: establishing mathematical models covering a plurality of interference factors such as water depth, water temperature, salinity, crawler posture, speed, acceleration and the like by using preset relation functions according to the correlation calculated in step S60.

The step S80 specifically includes: collecting all the data obtained in steps S10-S70, constructing a fitting matrix, applying the least-square method and performing regularization processing to finally obtain the weight coefficient of each interference factor.

The step S90 specifically includes: inputting the first compensated reflected wave obtained in step S40, the weight coefficients of various interference factors obtained in step S80, and the underwater environment parameters and pose information of the sea-bottom crawler obtained in step S10 into a pre-trained second reflected wave compensation model; after processing, a final compensated reflected wave can be obtained as the result of electromagnetic detection. Among these, the digital information in the specific execution steps of the electromagnetic detection interference compensation module is a floating-point sequence.

Among these, the pose information of the sea-bottom crawler includes position (including x, y, z coordinates), posture (including pitch angle, roll angle, heading angle), speed (including linear speed and angular speed), acceleration (including linear acceleration and angular acceleration).

Among these, the first reflected wave compensation model employs a neural network model with a multi-subnet structure, including a feature extraction module, a long-term feature sub-network, a window feature sub-network, an abnormal feature sub-network, and a fusion output sub-network;

The feature extraction module is used to extract the input and classify it into long-term features, window features, and abnormal features. The input includes the emitted wave, the reflected wave, as well as the time delay, amplitude attenuation, and discrimination of each sliding time window. The output includes the long-term features, window features, and abnormal features of the reflected wave;

The long-term feature sub-network is used to capture the long-term variation trend of reflected waves. The input is the reflected wave's long-term feature, and the output is an error compensation vector corresponding to the reflected wave's long-term feature, which is referred to as the first compensation vector. The structure is a multilayer LSTM network;

The window feature sub-network is used to process the reflected wave's features within a local time window. The input is the reflected wave's window feature, and the output is an error compensation vector corresponding to the reflected wave's window feature, which is referred to as the second compensation vector. The structure is a convolutional neural network;

The abnormal feature sub-network is used to detect and process abnormal patterns in reflected waves. The input is the reflected wave's abnormal feature, and the output is an error compensation vector corresponding to the reflected wave's abnormal feature, which is referred to as the third compensation vector. The structure is an autoencoder network;

The fusion output sub-network is used to integrate the outputs of respective sub-networks and generate the final compensation result. The input is the first compensation vector, the second compensation vector, and the third compensation vector, adopting a multi-head attention network structure, and the output is the first compensated reflected wave.

The second reflected wave compensation model employs a multi-branch neural network structure, including an environmental parameter branch network, a pose information branch network, a compensated reflected wave branch network, and a fusion branch network;

The environmental parameter branch network is used to process the influence of underwater environmental parameters. The input is underwater environmental parameters, and the output is the impact vector of environmental parameters on reflected waves. The structure is a multilayer perceptron;

The pose information branch network is used to process the influence of the sea-bottom crawler's pose information. The input is the sea-bottom crawler's pose information, and the output is the impact vector of pose information on reflected waves. The structure is LSTM;

The compensated reflected wave branch network is used to further optimize the first compensated reflected wave. The input is the first compensated reflection wave, and the output is the optimized compensated reflected wave. The structure is a residual network;

The fusion branch network is used to integrate the outputs of respective branch networks and generate the final compensation result. The input is the outputs of respective branch network, and the output is the final compensated reflected wave. The structure is a Transformer network combined with cross-attention mechanism.

Among these, the detailed steps of S80 are as follows:
a) Collecting data: the data obtained in steps S10-S70 are used, including:
the time delay, amplitude attenuation, and discrimination of the sliding time windows;
underwater environmental parameters (water depth, water temperature and salinity); and
pose information of the sea-bottom crawler (pitch angle, roll angle, heading angle, speed and acceleration).
b) Constructing a fitting matrix: the fitting matrix is constructed by taking respective interference factors as independent variables and taking time delay, amplitude attenuation and discrimination as dependent variables according to the interference equations established in the step S70.
c) Applying the least-square method: the least-square method is used to solve the fitting matrix and preliminarily obtain the weight coefficient of each interference factor.
d) Regularization processing: to avoid overfitting, regularization (such as L1 and L2 regularizations or Elastic Net) is applied to the results of the least-square method.
e) Cross-validation: the optimal regularization parameter is selected by using a k-fold cross-validation method.
f) Final fitting: all data is finally fitted by using the selected regularization parameter to obtain the weight coefficient of each interference factor.
g) Evaluating the fitting quality: the fitting quality is evaluated by calculating indexes such as a coefficient of determination ($R^2$), a Root Mean Square Error (RMSE) and the like.
h) Outputting results: the final weight coefficients of respective interference factors are output, including weight coefficients of water depth, water temperature, salinity, crawler pitch angle, roll angle, heading angle, speed, and acceleration.

The following is descriptions of interference equations expressed as formulas:

Water Depth Interference Equation:

$$D_w = a_1 \cdot d + a_2 \cdot \frac{\partial d}{\partial t} + a_3 \cdot e^{-b_1 d} + a_4 \cdot \log(d+1) + \varepsilon_1;$$

In the formula, $D_w$ is the degree of interference of water depth on electromagnetic waves; d is water depth; t is time; $a_1, a_2, a_3, a_4, b_1$ are coefficients to be determined; $\varepsilon_1$ is the first error term.

Parameter Acquisition Method:

d is directly measured by a depth sensor.

$$\frac{\partial d}{\partial t}$$

is calculated from continuous depth measurements:

$$\frac{\partial d}{\partial t} = \lim_{\Delta t \to 0} \frac{d(t+\Delta t) - d(t)}{\Delta t};$$

In practical applications, a discrete approximation may be used:

$$\frac{\partial d}{\partial t} \approx \frac{d(t+\Delta t) - d(t)}{\Delta t};$$

wherein $\Delta t$ is the sampling interval.

Water Temperature Interference Equation:

$$D_T = b_1 \cdot T + b_2 \cdot \frac{\partial T}{\partial z} + b_3 \cdot \sin(\omega T) + b_4 \cdot T^2 + \varepsilon_2;$$

In the formula, $D_T$ is the degree of interference of water temperature on electromagnetic waves; T is water temperature; z is depth; w is the angular frequency of periodic temperature variation; $b_1, b_2, b_3, b_4$ are coefficients to be determined; $\varepsilon_2$ is the second error term.

Parameter Acquisition Method:

T is directly measured by a temperature sensor.

$$\frac{\partial T}{\partial z}$$

is calculated by measuring temperature at different depths:

$$\frac{\partial T}{\partial z} \approx \frac{T(z + \Delta z) - T(z)}{\Delta z};$$

wherein $\Delta z$ is the depth interval. $\omega$ can be obtained through Fourier analysis of temperature time series data.

Salinity Interference Equation:

$$D_S = c_1 \cdot S + c_2 \cdot \frac{\partial S}{\partial x} + c_3 \cdot \frac{\partial S}{\partial y} + c_4 \cdot e^{i\theta S} + \varepsilon_3;$$

In the formula, $D_S$ is the degree of interference of salinity on electromagnetic waves; S is salinity; x, y are horizontal coordinates; i is the imaginary unit; $\theta$ is the phase factor; $c_1$, $c_2$, $c_3$, $c_4$ are coefficients to be determined; $\varepsilon_3$ is the third error term.

Parameter Acquisition Method:

S is directly measured by a salinity sensor.

$$\frac{\partial S}{\partial x}$$

and $$\frac{\partial S}{\partial y}$$

is calculated by measuring salinity at different horizontal positions:

$$\frac{\partial S}{\partial x} \approx \frac{S(x + \Delta x, y) - S(x, y)}{\Delta x};$$

$$\frac{\partial S}{\partial y} \approx \frac{S(x, y + \Delta y) - S(x, y)}{\Delta y};$$

wherein $\Delta x$ and $\Delta y$ are horizontal intervals. $\theta$ can be determined by analyzing the periodic variation in salinity data.

Crawler Pitch Angle Interference Equation:

$$D_p = d_1 \cdot \tan(\phi) + d_2 \cdot \frac{d\phi}{dt} + d_3 \cdot |\phi|^{1.5} + d_4 \cdot \phi^3 + \varepsilon_4;$$

In the formula, $D_p$ is the degree of interference of pitch angle on electromagnetic waves; $\phi$ is the pitch angle; t is time; $d_1$, $d_2$, $d_3$, $d_4$ are coefficients to be determined; $\varepsilon_4$ is the fourth error term.

Parameter Acquisition Method:

$\phi$ is directly measured by the inertial measurement unit.

$$\frac{d\phi}{dt}$$

is calculated from continuous pitch angle measurements:

$$\frac{d\phi}{dt} \approx \frac{\phi(t + \Delta t) - \phi(t)}{\Delta t};$$

wherein $\Delta t$ is the sampling interval.

Crawler Roll Angle Interference Equation:

$$D_r = e_1 \cdot \sin(\psi) + e_2 \cdot \frac{d\psi}{dt} + e_3 \cdot |\psi|^{1.5} + e_4 \cdot \psi^2 + \varepsilon_5;$$

In the formula, $D_r$ is the degree of interference of roll angle on electromagnetic waves; $\psi$ is the roll angle; t is time; $e_1$, $e_2$, $e_3$, $e_4$ are coefficients to be determined; $\varepsilon_5$ is the fifth error term.

Parameter Acquisition Method:

$\psi$ is directly measured by the inertial measurement unit.

$$\frac{d\psi}{dt}$$

is calculated from continuous roll angle measurements:

$$\frac{d\psi}{dt} \approx \frac{\psi(t + \Delta t) - \psi(t)}{\Delta t};$$

wherein $\Delta t$ is the sampling interval.

Crawler Heading Angle Interference Equation:

$$D_h = f_1 \cdot \cos(\theta) + f_2 \cdot \frac{d\theta}{dt} + f_3 \cdot e^{i\theta} + f_4 \cdot \theta^2 + \varepsilon_6;$$

In the formula, $D_h$ is the degree of interference of heading angle on electromagnetic waves; $\theta$ is the heading angle; t is time; i is the imaginary unit; $f_1$, $f_2$, $f_3$, $f_4$ are coefficients to be determined; $\varepsilon_6$ is the sixth error term.

Parameter Acquisition Method:

$\theta$ is directly measured by the inertial measurement unit.

$$\frac{d\theta}{dt}$$

is calculated from continuous heading angle measurements:

$$\frac{d\theta}{dt} \approx \frac{\theta(t + \Delta t) - \theta(t)}{\Delta t};$$

wherein $\Delta t$ is the sampling interval.

Crawler Speed Interference Equation:

$$D_v = g_1 \cdot |v| + g_2 \cdot \frac{\partial v}{\partial t} + g_3 \cdot v^2 + g_4 \cdot \log(|v|+1) + \varepsilon_7;$$

In the formula, $D_v$ is the degree of interference of speed on electromagnetic waves; v is the speed vector; t is time; $g_1$, $g_2$, $g_3$, $g_4$ are coefficients to be determined; $\varepsilon_7$ is the seventh error term.
Parameter Acquisition Method:
v is calculated by integrating the inertial measurement unit and GPS (if near the water surface).

$$\frac{\partial v}{\partial t}$$

is calculated from continuous speed measurements:

$$\frac{\partial v}{\partial t} \approx \frac{v(t + \Delta t) - v(t)}{\Delta t};$$

wherein $\Delta t$ is the sampling interval.
Crawler Acceleration Interference Equation:

$$D_a = h_1 \cdot |a| + h_2 \cdot \frac{\partial a}{\partial t} + h_3 \cdot a^2 + h_4 \cdot \sqrt{|a|} + \varepsilon_8;$$

In the formula, $D_a$ is the degree of interference of acceleration on electromagnetic waves; a is the acceleration vector; t is time; $h_1$, $h_2$, $h_3$, $h_4$ are coefficients to be determined; $\varepsilon_8$ is the eighth error term.
Parameter Acquisition Method:
a is directly measured by the inertial measurement unit.

$$\frac{\partial a}{\partial t}$$

is calculated from continuous acceleration measurements:

$$\frac{\partial a}{\partial t} \approx \frac{a(t + \Delta t) - a(t)}{\Delta t};$$

wherein $\Delta t$ is the sampling interval.
The steps of constructing the training dataset for the first reflected wave compensation model specifically include:
A large number of electromagnetic wave transmitting and receiving experiments is performed under different underwater environment conditions, and collecting data of emitted waves and reflected waves.
The collected data is preprocessed, including denoising, normalization, and time alignment.
The time delay, amplitude attenuation, and discrimination of each window are calculated using a sliding time window technique.
The processed data is divided into a training set, a validation set, and a test set.
The training steps for the first reflected wave compensation model specifically include: Step 101: initializing the parameters of each sub-network.

Step 102: inputting the training data into the feature extraction module to obtain long-term features, window features, and abnormal features.
Step 103: inputting these features into the corresponding sub-networks for forward propagation.
Step 104: integrating the output of each sub-network by using the fusion output sub-network.
Step 105: calculating the loss function between the output and the actual compensated reflected wave.
Step 106: calculating gradients by using back propagation algorithm, and updating network parameters.
Step 107: repeating steps 102 to 106 until a predetermined number of iterations is reached or a convergence condition is met.
Step 108: evaluating the model performance by using the validation set, and adjusting hyper-parameters if necessary.
Step 109: finally, evaluating the generalization capability of the model by using the test set.
The steps of constructing the training dataset for the second reflected wave compensation model specifically include:
Underwater environmental parameters, pose information of sea-bottom crawlers, and corresponding electromagnetic wave transmitting and receiving data are collected.
The first reflected wave compensation model is used to perform preliminary processing on the collected data.
The weight coefficient of each interference factor is calculated.
The processed data, weight coefficients, original environmental parameters, and pose information are combined into training samples.
The dataset is divided into a training set, a validation set, and a test set.
The training steps for the second reflected wave compensation model specifically include:
Step 201: initializing the parameters of each branch network.
Step 202: inputting the training data into each branch network for forward propagation.
Step 203: integrating the output of each branch network by using the fusion branch network.
Step 204: calculating the loss function between the output and the actual compensated reflected wave.
Step 205: calculating gradients by using back propagation algorithm, and updating network parameters.
Step 206: repeating steps 202 to 205 until a predetermined number of iterations is reached or a convergence condition is met.
Step 207: evaluating the model performance by using the validation set, and adjusting hyper-parameters if necessary.
Step 208: finally, evaluating the generalization capability of the model by using the test set.
Compared with existing technologies, the beneficial effects of the electromagnetic detection system based on sea-bottom crawlers provided by the present invention are as follows:
1. Comprehensive consideration of various interference factors: The method of the present invention not only considers underwater environmental parameters such as water depth, water temperature, and salinity, but also includes dynamic factors such as the position, pose, speed, and acceleration of the sea-bottom crawler. By establishing mathematical models that cover multiple sources of interference, it is possible to more comprehensively analyze and compensate for the impact of various interferences on reflected waves.

2. Use of adaptive compensation mechanism: The present invention adopts a multilayer neural network model to adaptively compensate for reflected waves. This model can automatically learn the impact of various interference factors on reflected waves according to environmental parameters and pose information measured in real time, and generate targeted compensation results. Compared to empirical formulas or static models, this method has stronger adaptability and universality.

3. Improved detection accuracy: By subjecting the reflected waves to multilayer compensation, the method of the present invention can effectively suppress the influence of various interference factors on the electromagnetic detection results.

In summary, the present invention solves the technical problem of insufficient detection accuracy caused by interference factors in existing sea-bottom electromagnetic detection technologies.

DETAILED DESCRIPTION OF THE EMBODIMENTS

To make the objects, technical solutions and advantages of the embodiments of the present invention clearer, the technical solutions in the embodiments of the present invention will be clearly and completely described below with reference to the accompanying drawings in the embodiments of the present invention.

Figure 1:
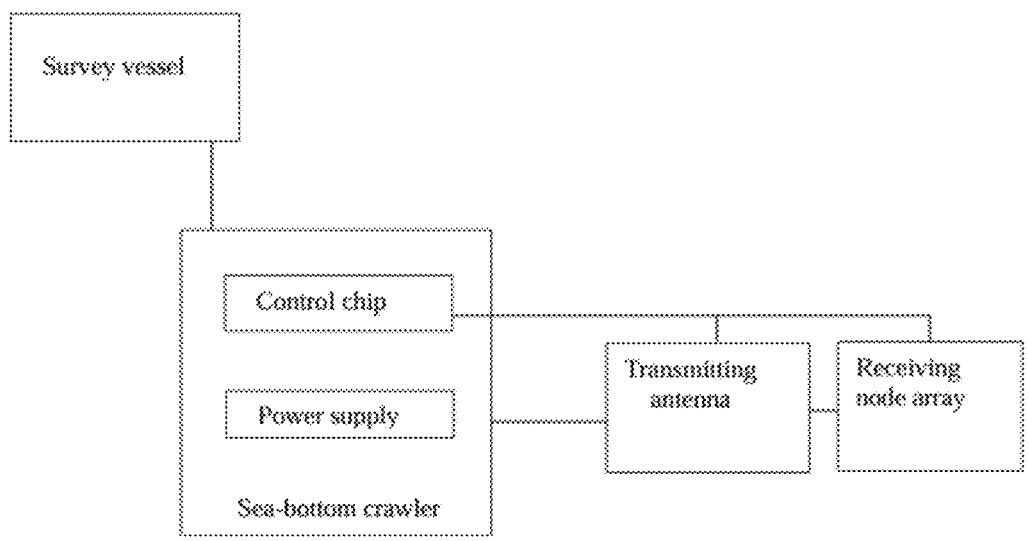
FIG. 1 is a schematic diagram of the composition of an electromagnetic detection system based on a sea-bottom crawler provided by the present invention.

As shown in FIG. 1, it is a schematic diagram of the composition of an electromagnetic detection system based on a sea-bottom crawler provided by the present invention. The system comprises: a survey vessel, a sea-bottom crawler, a transmitting antenna, a receiving node array, a control chip, and a power supply; wherein the survey vessel is connected to the sea-bottom crawler through a traction rope, and the tail of the sea-bottom crawler is provided with a drag cable, and on the drag cable, the transmitting antenna and the receiving node array are mounted, and both the control chip and the power supply are configured in the integrated electronic cabin of the sea-bottom crawler; wherein the power supply provides electrical energy to the sea-bottom crawler, transmitting antenna, receiving node array, and control chip, and the control chip is electrically connected to the transmitting antenna, the receiving node array, and the power system of the sea-bottom crawler; wherein an electromagnetic detection interference compensation device for performing interference elimination and compensation on reflected waves received by the receiving node array is performed by the control chip; wherein the control chip is configured to have a data transmission device for sending the compensated electromagnetic detection results to the survey vessel. The specific composition of this system is described below in detail:

1. Overall Composition of the System 1.1 Sea-bottom crawler: The sea-bottom crawler is the core carrier of this system, which adopts a sealed metal shell structure and integrates electronic devices, power systems, and various sensors inside. The bottom of the crawler is equipped with tracks or wheeled structures for moving on the seafloor. The top of the crawler is provided with a connection interface for connecting with a composite cable.

1.2 Electromagnetic transmitting antenna: The electromagnetic transmitting antenna adopts a flexible design and can be folded and stored in a specialized storage device inside or outside the crawler. The antenna is made of conductive material and covered with insulating material, so that it can conduct high currents and emit electromagnetic signals in seawater.

1.3 Receiving node array: The receiving node array consists of multiple independent receiving nodes, each containing an electric field sensor and a magnetic field sensor. Nodes are connected by flexible connecting wires and can be stored in specialized storage devices inside or outside the crawler.

1.4 Composite Cable: The composite cables are used to connect the sea-bottom crawler and the survey vessel, and contain power transmission lines and optic fiber communication lines inside. Composite cables have sufficient strength to withstand the pressure and tension of underwater environments.

1.5 Survey vessel: The survey vessel is provided with a dynamic positioning system, a winch system, a lifting equipment, a monitoring system, and a data processing system.

2. Detailed Structure of a Sea-Bottom Crawler 2.1 Shell structure: The crawler shell is made of pressure-resistant materials and can withstand the high pressure of deep-sea environments. The shell is provided with a sealed hatch, so that internal equipment can be easily maintained and replaced.

2.2 Power system: The power system comprises a plurality of motors and propellers, and can realize the actions of advancing, retreating, steering and the like of the crawler. The propeller is designed with a sealed structure to prevent seawater from penetrating.

2.3 Electronic cabin: The electronic cabin is located inside the crawler and comprises core electronic devices such as a main controller, a power management system, and a communication system. The electronic cabin adopts a special heat dissipation design to ensure that the equipment works normally in high-pressure environments.

2.4 Excitation source driving unit: The excitation source driving unit is used to control the electromagnetic transmitting antenna and can generate electromagnetic signals of different waveforms, frequencies, and intensities. This unit adopts high-efficiency power modules that can output high currents.

2.5 Receiving node driver unit: The receiving node driver unit is responsible for controlling the receiving node array, including data acquisition, storage, and transmission functions. This unit uses high-precision analog-to-digital converters to ensure the accuracy of data acquisition.

2.6 Sensor system: The sensor system comprises a depth gauge, an altimeter, a pose sensor, an acoustic positioning system, and the like. These sensors are used to monitor the position, pose, and surrounding environmental parameters of the crawler.

2.7 Lighting and camera system: The crawler is provided with high brightness LED lighting and high-definition cameras for underwater environment observation and operation monitoring.

3. Electromagnetic Transmitting Antenna 3.1 Structural design: The electromagnetic transmitting antenna adopts a strip-shaped design and can be folded for storage. The antenna consists of a plurality of sections of flexible conductors, and each section is connected by a flexible connecting piece, so that the antenna can be easily unfolded and stored.

3.2 Material selection: The antenna conductors are made of highly conductive materials, such as copper or aluminum alloy. The outer layer is covered with insulation material, such as a specialty polymer, that is resistant to seawater corrosion.

3.3 Connection method: One end of the antenna is connected to the excitation source driving unit of the crawler, and the other end is provided with a buoyancy device or a heavy object to adjust the pose of the antenna in water.

4. Receiving Node Array 4.1 Node structure: Each receiving node is a sealed spherical or cylindrical structure, with integrated electric field sensors, magnetic field sensors, data acquisition circuits, and a memory inside.

4.2 Sensor configuration: Each node comprises a three-component electric field sensor and a three-component magnetic field sensor, so that it can measure electromagnetic fields in all directions.

4.3 Node connection: Nodes are connected through flexible cables, and the cable contains a power line and a data transmission line inside. The entire array is foldable for storage, so that it can be easily deployed and recovered.

4.4 Power supply method: The receiving node can be powered by a built-in battery or can obtain power from the crawler through a connecting cable.

5. Composite Cable 5.1 Structural design: The composite cable consists of a multilayer structure, including a central reinforcement core, a power transmission layer, an optical fiber communication layer, and an outer protective sleeve.

5.2 Power transmission: The power transmission layer adopts a plurality of strands of copper conductors, which can bear high-power power transmission and provide continuous and stable power supply for the crawler.

5.3 Data communication: The optic fiber communication layer comprises a plurality of optical fibers for high-speed data transmission, ensuring real-time communication between the crawler and the survey vessel.

5.4 Strength design: The composite cable has sufficient tensile strength to withstand the pressure and tension of underwater environments while maintaining good flexibility.

6. Survey Vessel Equipment 6.1 Dynamic positioning system: The survey vessel is equipped with a dynamic positioning system, so that it can maintain a stable position at sea, facilitating equipment deployment and recovery.

6.2 Winch system: The winch system is used for laying and retrieving composite cables, and has tension monitoring and automatic adjustment functions.

6.3 Lifting equipment: The survey vessel is equipped with a crane for the deployment and retrieval of sea-bottom crawlers.

6.4 Monitoring system: The monitoring system comprises a multi-screen display, an operation desk and a computer system for monitoring the underwater operation state in real time.

6.5 Data processing system: The data processing system consists of a high-performance computer and a mass storage device for receiving, storing, and initially processing subsea electromagnetic exploration data.

Figure 2:
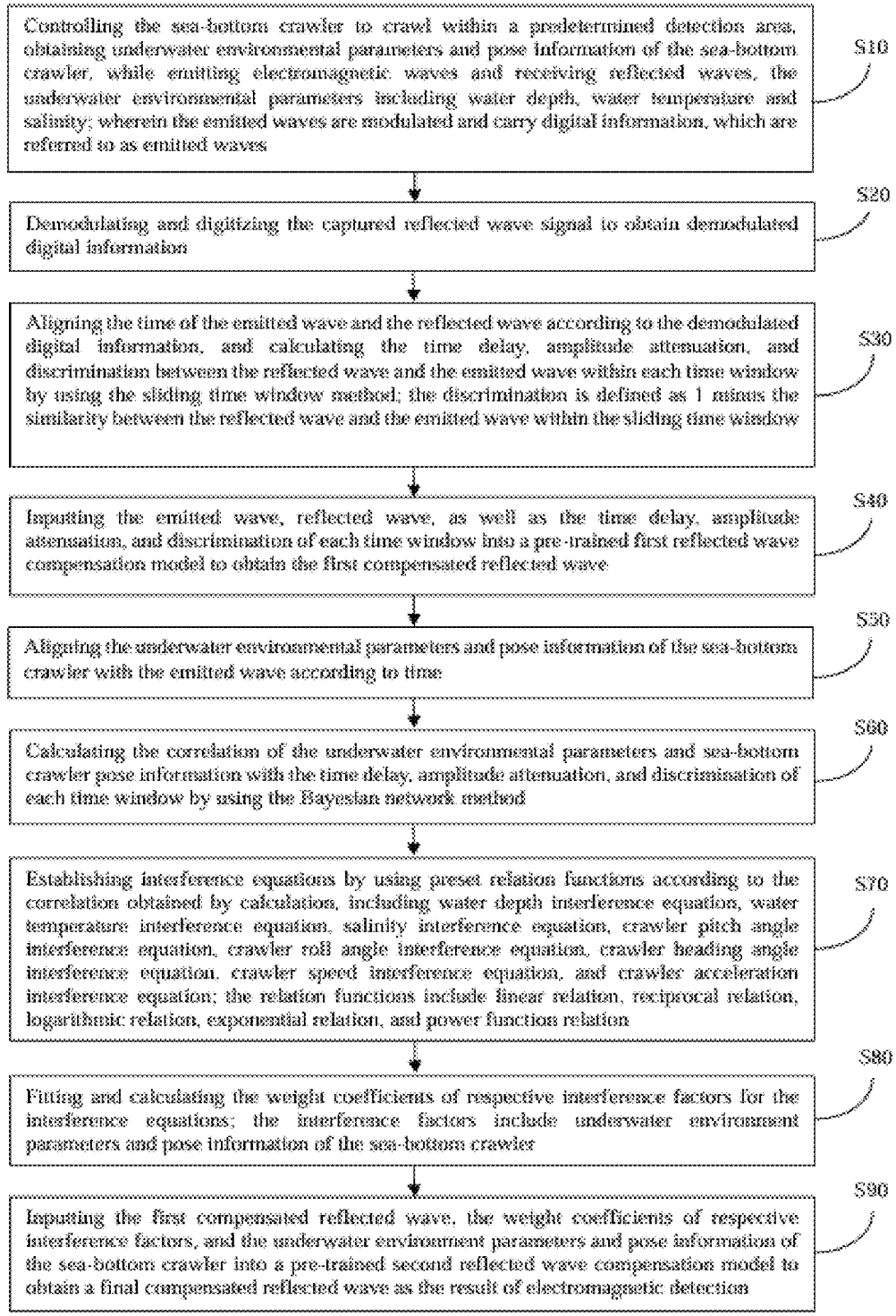
FIG. 2 is a flowchart of the execution steps of an electromagnetic detection interference compensation module.

As shown in FIG. 2, it is a flowchart of the specific execution steps of the electromagnetic detection interference compensation module. Below is a detailed description of the specific implementation of the above steps:

Step S10 is implemented specifically as follows: First, the sea-bottom crawler is controlled to crawl within a predetermined detection area; during the crawling process, the sea-bottom crawler will collect and record real-time underwater environmental parameters, including water depth, water temperature and salinity, while obtaining its own pose information such as position (x, y, z coordinates), posture (pitch angle, roll angle, heading angle), speed (linear speed and angular speed), and acceleration (linear acceleration and angular acceleration). At the same time, the electromagnetic wave transmitter on the sea-bottom crawler will emit electromagnetic waves to a predetermined area, and these emitted waves are digitally modulated and carry digital information in the form of floating-point number sequences. The electromagnetic waves emitted by the electromagnetic wave transmitter will be reflected in the underwater environment, and the electromagnetic wave receiver on the sea-bottom crawler will capture these reflected waves.

Step S20 is implemented specifically as follows: The captured reflected wave signals are demodulated and digitized to extract the digital information carried in the reflected waves. The digital information will be compared and analyzed with the digital information in the emitted waves.

Step S30 is implemented specifically as follows: First, the time of the emitted wave and the reflected wave are aligned; then the time delay, amplitude attenuation, and discrimination between the reflected wave and the emitted wave within each time window are calculated by using the sliding time window method. Among these, the definition of discrimination is 1 minus the similarity between the reflected wave and the emitted wave within the sliding time window. These features parameters will play an important role in subsequent reflected wave compensation.

Step S40 is implemented specifically as follows: The information obtained in steps S10 to S30, including the emitted wave, reflected wave, as well as the time delay, amplitude attenuation, and discrimination of each time window, are input into a pre-trained first reflected wave compensation model. This model adopts a neural network architecture with a multi-subnet structure, including a feature extraction module, a long-term feature sub-network, a window feature sub-network, an abnormal feature sub-network, and a fusion output sub-network. After processing by this model, a preliminary compensated reflected wave can be obtained, which is referred to as the first compensated reflected wave.

Step S50 is implemented specifically as follows: The underwater environmental parameters (water depth, water temperature, salinity) and pose information (position, posture, speed, acceleration) of the sea-bottom crawler obtained in step S10 are aligned with the emitted wave information in step S10 to ensure time synchronization among various types of information.

Step S60 is implemented specifically as follows: The correlation of the underwater environmental parameters (water depth, water temperature, salinity) and the sea-bottom crawler's pose information (pitch angle, roll angle, heading angle, speed and acceleration) with the time delay, amplitude attenuation, and discrimination of each time window is calculated by using the Bayesian network method. This can result in the obtaining of the degree of influence of various interference factors on the reflected waves.

Step S70 is implemented specifically as follows: Interference equations such as water depth interference equation, water temperature interference equation, salinity interference equation, crawler posture interference equation (pitch angle, roll angle, heading angle), crawler speed interference equation, and crawler acceleration interference equation are established according to the correlation calculated in the step S60 by using a series of preset relation functions. These relation functions include various forms such as linear relation, reciprocal relation, logarithmic relation, exponential relation, and power function relation. The specific expression formulas for the interference equations are as follows:

Water Depth Interference Equation:

$$D_w = a_1 \cdot d + a_2 \cdot \frac{\partial d}{\partial t} + a_3 \cdot e^{-b_1 d} + a_4 \cdot \log(d+1) + \varepsilon_1;$$

wherein $D_w$ is the degree of interference of water depth on electromagnetic waves; dis water depth; t is time; $a_1$, $a_2$, $a_3$, $a_4$, $b_1$ are coefficients to be determined; $\varepsilon_1$ is the first error term. Water depth d is directly measured by a depth sensor, and $$\frac{\partial d}{\partial t}$$

is calculated from continuous depth measurements.

Water Temperature Interference Equation:

$$D_T = b_1 \cdot T + b_2 \cdot \frac{\partial T}{\partial z} + b_3 \cdot \sin(\omega T) + b_4 \cdot T^2 + \varepsilon_2;$$

wherein $D_T$ is the degree of interference of water temperature on electromagnetic waves; T is water temperature; z is depth; $\omega$ is the angular frequency of periodic temperature variation; $b_1$, $b_2$, $b_3$, $b_4$ are coefficients to be determined; $\varepsilon_2$ is the second error term. Water temperature T is directly measured by a temperature sensor, and $$\frac{\partial T}{\partial z}$$

is calculated by measuring temperature at different depths.

Salinity Interference Equation:

$$D_S = c_1 \cdot S + c_2 \cdot \frac{\partial S}{\partial x} + c_3 \cdot \frac{\partial S}{\partial y} + c_4 \cdot e^{i\theta S} + \varepsilon_3;$$

wherein $D_S$ is the degree of interference of salinity on electromagnetic waves; S is salinity; x, y are horizontal coordinates; i is the imaginary unit; $\theta$ is the phase factor; $c_1$, $c_2$, $c_3$, $c_4$ are coefficients to be determined; $\varepsilon_3$ is the third error term. Salinity S is directly measured by a salinity sensor, and $$\frac{\partial S}{\partial x}$$

and $$\frac{\partial S}{\partial y}$$

is calculated by measuring salinity at different horizontal positions.

Crawler Pitch Angle Interference Equation:

$$D_p = d_1 \cdot \tan(\phi) + d_2 \cdot \frac{d\phi}{dt} + d_3 \cdot |\phi|^{1.5} + d_4 \cdot \phi^3 + \varepsilon_4;$$

wherein $D_p$ is the degree of interference of pitch angle on electromagnetic waves; $\phi$ is the pitch angle; t is time; $d_1$, $d_2$, $d_3$, $d_4$ are coefficients to be determined; $\varepsilon_4$ is the fourth error term. Pitch angle $\phi$ is directly measured by the inertial measurement unit, and $$\frac{d\phi}{dt}$$

is calculated from continuous pitch angle measurements.

Crawler Roll Angle Interference Equation:

$$D_r = e_1 \cdot \sin(\psi) + e_2 \cdot \frac{d\psi}{dt} + e_3 \cdot |\psi|^{1.5} + e_4 \cdot \psi^2 + \varepsilon_5;$$

wherein $D_r$ is the degree of interference of roll angle on electromagnetic waves; $\psi$ is the roll angle; t is time; $e_1$, $e_2$, $e_3$, $e_4$ are coefficients to be determined; $\varepsilon_5$ is the fifth error term. Roll angle $\psi$ is directly measured by the inertial measurement unit, and $$\frac{d\psi}{dt}$$

is calculated from continuous roll angle measurements.

Crawler Heading Angle Interference Equation:

$$D_h = f_1 \cdot \cos(\theta) + f_2 \cdot \frac{d\theta}{dt} + f_3 \cdot e^{i\theta} + f_4 \cdot \theta^2 + \varepsilon_6;$$

wherein $D_h$ is the degree of interference of heading angle on electromagnetic waves; $\theta$ is the heading angle; t is time; i is the imaginary unit; $f_1$, $f_2$, $f_3$, $f_4$ are coefficients to be determined; $\varepsilon_6$ is the sixth error term. Heading angle $\theta$ is directly measured by the inertial measurement unit, and $$\frac{d\theta}{dt}$$

is calculated from continuous heading angle measurements.

Crawler Speed Interference Equation:

$$D_v = g_1 \cdot |v| + g_2 \cdot \frac{\partial v}{\partial t} + g_3 \cdot v^2 + g_4 \cdot \log(|v|+1) + \varepsilon_7;$$

wherein $D_v$ is the degree of interference of speed on electromagnetic waves; v is the speed vector; t is time; $g_1, g_2, g_3, g_4$ are coefficients to be determined; $\varepsilon_7$ is the seventh error term. Speed v is calculated by integrating the inertial measurement unit and GPS (if near the water surface), and $$\frac{\partial v}{\partial t}$$

is calculated from continuous speed measurements.

Crawler Acceleration Interference Equation:

$$D_a = h_1 \cdot |a| + h_2 \cdot \frac{\partial a}{\partial t} + h_3 \cdot a^2 + h_4 \cdot \sqrt{|a|} + \varepsilon_8;$$

wherein $D_a$ is the degree of interference of acceleration on electromagnetic waves; a is the acceleration vector; t is time; $h_1, h_2, h_3, h_4$ are coefficients to be determined; $\varepsilon_8$ is the eighth error term. Acceleration a is directly measured by the inertial measurement unit, and $$\frac{\partial a}{\partial t}$$

is calculated from continuous acceleration measurements.

Step S80 is implemented specifically as follows: First, all the data obtained in steps S10-S70 are collected, including the time delay, amplitude attenuation, and discrimination of the sliding time window, as well as the underwater environmental parameters (water depth, water temperature, salinity) and the pose information (pitch angle, roll angle, heading angle, speed and acceleration) of the sea-bottom crawler. Then, according to the interference equations established in step S70, each interference factor is taken as the independent variable, and time delay, amplitude attenuation, and discrimination are taken as the dependent variables to construct a fitting matrix. Next, the least-square method is applied to solve this fitting matrix to preliminarily obtain the weight coefficient of each interference factor. To avoid overfitting, it is also necessary to regularize the results of the least-square method, such as L1 regularization or L2 regularization. Then, the optimal regularization parameter is selected by using a k-fold cross-validation method. Finally, all data is finally fitted by using the selected regularization parameter to obtain the weight coefficient of each interference factor. To evaluate the quality of the fitting, it is also necessary to calculate indexes such as a coefficient of determination ($R^2$), a Root Mean Square Error (RMSE) and the like. Using the above steps, the weight coefficients of respective interference factors such as water depth, water temperature, salinity, crawler pitch angle, roll angle, heading angle, speed, acceleration and the like can be obtained.

Step S90 is implemented specifically as follows: The first compensated reflected wave obtained in step S40, the weight coefficients of various interference factors obtained in step S80, and the underwater environment parameters and pose information of the sea-bottom crawler obtained in step S10 are input together into a pre-trained second reflected wave compensation model. This model employs a multi-branch neural network structure, including an environmental parameter branch network, a pose information branch network, a compensated reflected wave branch network, and a fusion branch network. After processing by this model, a final compensated reflected wave can be obtained as the result of electromagnetic detection.

In general, the invention provides an electromagnetic detection method based on sea-bottom crawlers. By real-time measurement of underwater environmental parameters and crawler pose information, as well as multi-level compensation of reflected waves, it can effectively suppress the influence of various interference factors on electromagnetic detection results and improve detection accuracy. Among these, the key technologies include: 1) using digital modulation to emit electromagnetic waves, and demodulating the reflected waves and extracting features; 2) establishing mathematical models that cover a plurality of interference factors and solving the weight coefficient of each interference factor by the least-square method; and 3) adopting a neural network model with a multi-subnet structure for multi-level compensation of reflected waves.

Specifically, the principle of the present invention is as follows:

First, the sea-bottom crawler crawls within the designated detection area, collecting real-time environmental parameters such as water depth, water temperature, salinity, as well as pose information such as position, posture, speed, acceleration, and the like. At the same time, the electromagnetic wave transmitter on the sea-bottom crawler will emit digitally modulated electromagnetic waves to a predetermined area, carrying digital information in the form of floating-point number sequences. These emitted waves will be reflected in the underwater environment, and the electromagnetic wave receiver on the sea-bottom crawler will capture these reflected wave signals. As the excitation source is in direct contact with the seafloor surface, electromagnetic waves can be effectively excited, and more electromagnetic waves can directly enter the sedimentary strata, reducing the diffusion and attenuation of excited electromagnetic waves by highly conductive seawater. As the receiving array is in direct contact with the seafloor surface, it can effectively receive electromagnetic waves.

Next, the captured reflected wave signals are demodulated and digitized to extract the digital information carried therein. Then, the time delay, amplitude attenuation, and discrimination between the reflected wave and the emitted wave within each time window are calculated by using the sliding time window method. These parameters can reflect the influence of various interference factors on reflected waves.

Based on the above feature parameters, the present invention adopts a neural network model with a multi-subnet structure to carry out a preliminary reflected wave compensation. The model includes a feature extraction module, a long-term feature sub-network, a window feature sub-network, an abnormal feature sub-network, and a fusion output sub-network. By working together, these sub-networks can capture the reflected wave's long-term trend, features within a local time window and abnormal patterns, and generate a preliminary compensation result.

In order to further improve the compensation effect, the present invention also establishes a multi-branch neural network model. The model includes an environmental parameter branch network, a pose information branch network, a compensated reflected wave branch network, and a fusion branch network. The environmental parameter branch network and the pose information branch network are used to separately process the impact of environmental parameters and pose information on reflected waves. The compensated reflected wave branch network further optimizes the preliminary compensation result, and the fusion branch network integrates the outputs of each branch to generate the final compensation results.

It is worth noting that before establishing the compensation model mentioned above, the method of the present invention will also calculate the correlation between various interference factors and reflected waves using the Bayesian network, and establish mathematical models, namely interference equations, covering a plurality of interference factors such as water depth, water temperature, salinity, crawler posture, speed, acceleration and the like. This provides important prior knowledge and parameter basis for subsequent neural network models.

In general, the method of the present invention fully utilizes the dynamic measurement capability of sea-bottom crawlers, establishes mathematical models covering multiple interference factors, and adopts an adaptive neural network compensation mechanism, which can effectively suppress the influence of various interferences on electromagnetic detection results and improve detection accuracy.

Figure 3:
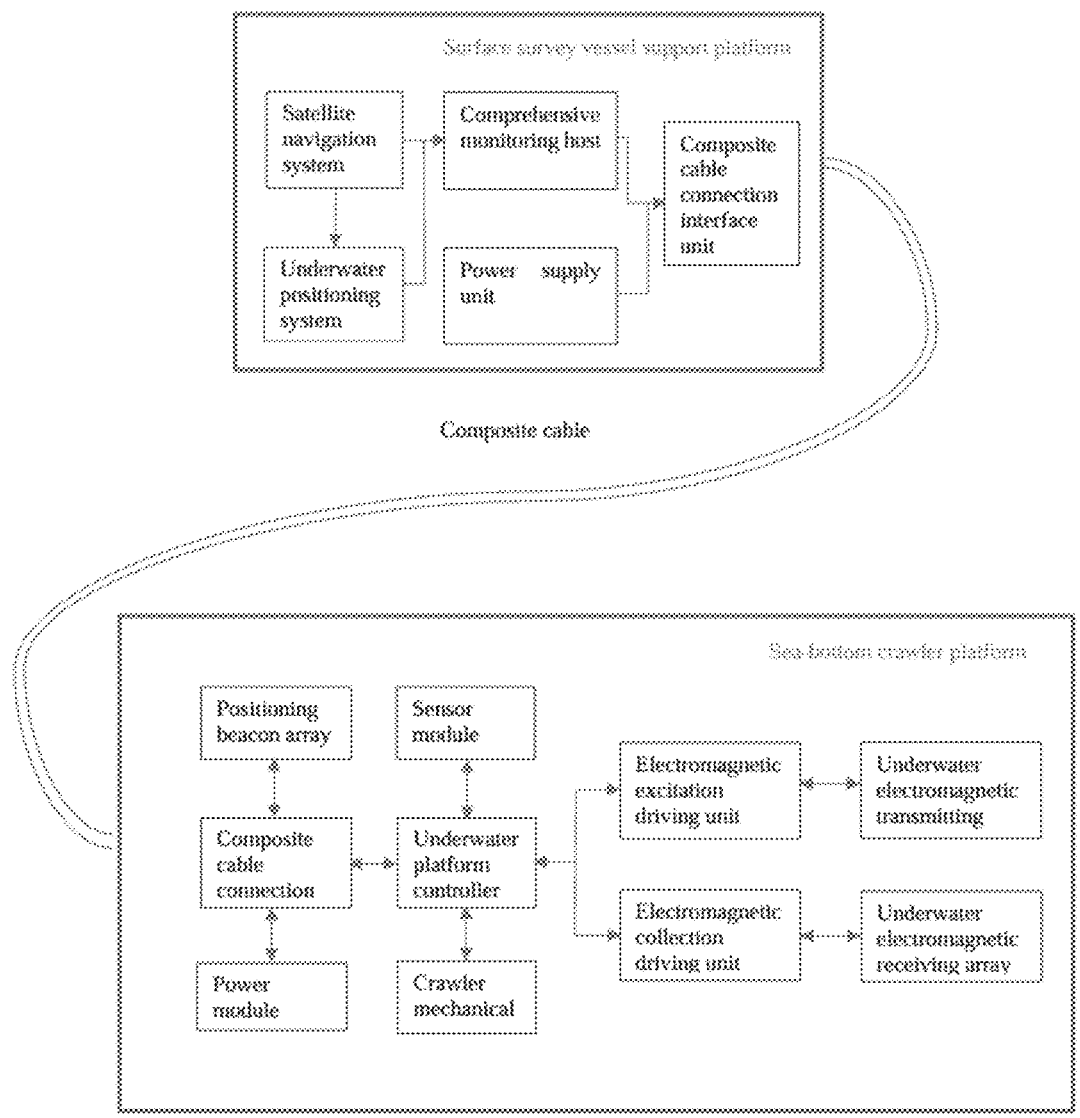
FIG. 3 is a schematic diagram of the composition of the system in Example 1.

In order to better understand and implement the present invention, a specific example, Example 1, is provided below to demonstrate the hardware composition and operation of the present invention: As shown in FIG. 3, the electromagnetic detection system based on a sea-bottom crawler in Example 1 mainly consists of the following parts: a sea-bottom crawler, an electromagnetic transmitting antenna, a receiving node array, a composite cable, and a survey vessel, which are divided into a surface survey vessel support platform and a sea-bottom crawler platform. The specific implementation method and working process of each compositional part will be described below in detail.

1. Sea-Bottom Crawler

The sea-bottom crawler is the core carrier of the system, and a ROV3000 deep-sea crawler is used, with the following main parameters:

Maximum working depth: 3000 meters;
Dimensions: 2.5 meters in length, 1.8 meters in width, and 1.2 meters in height;
Weight: about 1500 kilograms in air and about 50 kilograms underwater (slight buoyancy);
Maximum crawling speed: 2 knots (about 1 meter/second);
Power system: 6 400 W propellers, capable of achieving omnidirectional motion;
Power supply: DC380V, maximum power 15 kW;

The crawler body integrates the following main components:

a) Electronic cabin: It is made of a titanium alloy material, and core electronic devices such as a main controller, a power management system, and a communication system are installed therein. The main controller adopts Intel Core i7-10700 processor, with a main frequency of 3.8 GHz, 16 GB RAM, and 512 GB SSD storage.

b) Excitation source driving unit: It uses high-efficiency IGBT (Insulated Gate Bipolar Transistor) power modules, with a maximum output current of 1000 A and a voltage range of 0-1000V, capable of generating various waveforms of electromagnetic signals.

c) Receiving node driver unit: It uses a 24 bit high-precision ADC (analog-to-digital converter), with a sampling rate of up to 192 KHz and a dynamic range of 144 dB.

d) Sensor module: It includes a depth gauge (accuracy±0.01% FS), an altimeter (accuracy±1 cm), a pose sensor (accuracy±0.1°), and an acoustic positioning system (accuracy±0.1 m).

e) Lighting system: 4 500 W LED lights with a total luminous flux of 80000 lumens.

f) Camera system: 2 4K ultra-high definition cameras, capable of 360° rotation.

2. Electromagnetic Transmitting Antenna

The electromagnetic transmitting antenna adopts a negative buoyancy design to ensure that it can maintain good contact with the ground on the seafloor. The specific parameters are as follows:

Length: 100 meters; diameter: 50 millimeters; material: the outer layer is a polyurethane sleeve, and the inner layer is a copper conductor; resistance: 0.01 Ω/m; maximum operating current: 1000 A; frequency range: 0.1 Hz-10 kHz;

3. Receiving Node Array

The receiving node array consists of 10 receiving nodes, with a spacing of 10 meters between each node and a total length of 100 meters. Each receiving node contains the following sensors:

Electric field sensor: a three-component orthogonal electric field sensor; magnetic field sensor: a three-component magnetometer; and tiltmeter: accuracy of 0.1°;

Main Parameters of the Receiving Node Array:

Sampling rate: maximum 192 kHz, adjustable; resolution: 24 bits; storage capacity: 256 GB per node; battery: a lithium-ion battery with a capacity of 100 Wh, capable of continuous operation for 72 hours;

4. Composite Cable

Composite cables are used to connect the sea-bottom crawler and the survey vessel, providing power transmission and data communication functions. The main parameters are as follows:

Length: 5000 meters; diameter: 32 millimeters; weight: 1.2 kg/m (in air); tensile strength: 150 kN; power transmission: 3-phase 380 VAC, maximum power 20 kW; data communication: optic fiber communication, bandwidth 10 Gbps; material: the outer layer is a polyurethane sleeve, and the inner layer contains copper conductors and optical fibers;

5. Investigation Vessel

The survey vessel is selected from a 3000-ton ocean survey vessel, provided with the following main equipment:

A DP2 level dynamic positioning system; a composite cable winch: a capacity of 5000 meters, a maximum tension of 200 kN; a deck crane: a maximum lifting capacity of 10 tons; an integrated monitoring host: using a high-performance workstation and provided with a multi-screen display system; a data storage system: using RAID5 array and having a total capacity of 100 TB; an uninterruptible power supply system: having a capacity of 100 kVA, capable of continuously supplying power for 2 hours.

The working flow is as follows:

(I) Preparation Before Operation

1. Device inspection: On the deck of the survey vessel, a skilled person first conducts a comprehensive inspection of the sea-bottom crawler, namely checking the appearance of the crawler to ensure that there is no obvious damage or corrosion; turning on the power of the crawler and verify that all systems start normally; testing the working states of 6 propellers to ensure that the rotating speed and the thrust are normal; checking the tightness of the electronic cabin to ensure that there is no risk of water leakage; calibrating the depth gauge, altimeter, and pose sensor; and testing the camera system and lighting system. Next, the skilled person inspects the electromagnetic transmitting equipment, namely checking the appearance of the transmitting antenna to ensure that there is no damage; measuring the resistance of the transmitting antenna to ensure that it is around 0.01 Ω/m; testing the driving unit of the excitation source and verifying that the output is normal at different energy levels (100 A, 500 A, 1000 A); and checking the connection interface between the transmitting antenna and the crawler. Then, an inspection is carried out on the underwater electromagnetic receiving array, namely checking the appearance of 10 receiving nodes; testing the battery level of each node to ensure sufficient power; calibrating the electric field sensor, magnetic field sensor, and the inclinometer of each node; testing data acquisition and storage functions; and checking the connection interface of the receiving array and the crawler. Finally, the composite cable is checked, namely checking whether the outer sleeve of the composite cable is intact; testing the power transmission function to ensure a normal 380 VAC power supply; testing the optic fiber communication and verifying the availability of 10 Gbps bandwidth; and checking the connection interfaces of the composite cable with the crawler and the survey vessel;

2. System Connection

After confirming that all devices have been detected correctly, the skilled person starts to carry out system connection, namely connecting the electromagnetic transmitting antenna to the excitation source driving unit of the crawler; connecting the receiving node array to the receiving node driving unit of the crawler; and connecting one end of the composite cable with the crawler, and connecting the other end of the composite cable with the devices on a survey ship;

3. System Testing

After completing the connection, a whole system testing is carried out, namely testing the communication between the crawler and the survey vessel to ensure stable data transmission; testing the power supply to ensure normal power supply from the survey vessel to the crawler; and conducting a simulation test on electromagnetic transmitting and receiving to verify that the whole system works normally;

(II) Device Placement

1. Survey vessel positioning: After the survey vessel arrives at the operation sea area, the ship's position is maintained by using a DP2 dynamic positioning system, and the speed of the ship is reduced to about 2 knots for stable speed navigation.

2. Placement of receiving array: The skilled person first places the far end (10th node) of the receiving node array into the sea. As the survey vessel slowly advances, the remaining nodes are gradually deployed. In the deployment process, the state information of each node is monitored to ensure that they work normally;

3. Layout of transmitting antennas: When the layout of the receiving array is nearly completed, the electromagnetic transmitting antenna is deployed; the far end of the antenna enters the water first and the entire antenna is gradually deployed;

4. Crawler deployment: When the deployment of the transmitting antenna is nearly completed, the crawler is lifted using a deck crane, and at the same time, the composite cable is placed. The depth gauge and altimeter data of the crawler are monitored, and the cable placing speed of the composite cable is adjusted. When the crawler is about 10 meters away from the seafloor, the cable placing speed is slowed down. After the crawler reaches the bottom, the composite cable is kept slightly more than needed for the crawler to move.

(III) Underwater Electromagnetic Exploration Operation

1. Parameter Settings

The skilled person in the survey vessel laboratory sets the following parameters through the comprehensive monitoring host:

Crawler movement path: a grid path is designed according to the exploration area; the length of each measuring line is 1000 meters, and the line interval is 100 meters;

Crawling speed: set to be 0.5 m/s;

Excitation source parameters: excitation current: 500 A; excitation waveform: square wave; fundamental frequency: 0.25 Hz; excitation duration: 4 seconds; interval time: 16 seconds; array parameters: sampling rate: 4096 Hz; sampling length: continuous sampling.

2. Start of operation: the crawler is started to move along the set path; the electromagnetic transmitting system is activated to emit electromagnetic signals according to the set parameters; and the receiving node array begins to continuously collect data;

3. Real-Time Monitoring

The skilled person in the survey vessel laboratory monitors the following information in real-time through the integrated monitoring host: the crawler's position, depth, and pose; The working state of the transmitting system, including output current and voltage waveforms; the working state of the receiving nodes, including signal strength and data quality; the state of the composite cable, including tension and length;

4. Data transmission and storage: The received electromagnetic data is transmitted in real-time to the survey vessel through a composite cable. The data is stored in the RAID5 array by the data storage system on the survey vessel. At the same time, the receiving node also stores a copy of the data locally as a backup;

5. Emergency Response

The skilled person will take corresponding measures if encountering the following situations: If the crawler deviates from the predetermined path, the direction of the crawler will be adjusted through the comprehensive monitoring host. If the transmitting system is abnormal, attempts will be made to adjust transmission parameters, such as reducing transmission power, and if the problem persists, the transmission will be suspended. If the receiving nodes are abnormal, e.g., a single node is abnormal, the operation is continued, but the data of that node is marked up; if multiple nodes are abnormal, it will be considered to recover the device for maintenance. If the tension of the composite cable is abnormal, the crawler is immediately stopped, and the ship's position is adjusted to reduce the tension.

(IV) Completion of Operation and Device Recovery

1. Operation completion procedure: After the predetermined survey line is completed, the crawler is stopped; the electromagnetic transmitting system is shut down; the receiving node data collection is stopped; and the acquired data is subjected to quick quality inspection;

2. Device recovery: The composite cable winch is started to recover the composite cable; the ascending process of the crawler is monitored, keeping the speed slow and stable; when the crawler approaches the sea surface, the deck crane is used to assist in lifting it onto the deck. Next, the transmitting antenna is recovered, and attention is paid so that it is not entangled. Finally, the receiving node array is recovered and the state of each node is checked one by one.

In order to further better understand and implement the present invention, a specific example, Example 2, of the electromagnetic detection interference compensation module of the present invention is provided below. The specific steps of Example 2 are described in detail as follows:

Step S10 is implemented specifically as follows:

First, the sea-bottom crawler is controlled to crawl within a predetermined detection area. During the crawling process, the sea-bottom crawler will collect and record real-time underwater environmental parameters. Specifically, the sea-bottom crawler is provided with a depth sensor, a temperature sensor, and a salinity sensor, which can obtain information such as water depth d, water temperature T, and salinity S by these sensors. At the same time, the sea-bottom crawler is also provided with an inertial measurement unit and GPS (if near the water surface), which can obtain the crawler's pose information such as position (x, y, z), posture ($\phi$, $\psi$, $\theta$), speed ($v_x$, $v_y$, $v_z$, $\omega_x$, $\omega_y$, $\omega_z$), acceleration ($a_x$, $a_y$, $a_z$, $\alpha_x$, $\alpha_y$, $\alpha_z$) and the like.

At the same time, the sea-bottom crawler is provided with an electromagnetic wave transmitter and a receiver. The electromagnetic wave transmitter will emit digitally modulated electromagnetic waves to a predetermined area, and these emitted waves can be expressed as:

$$s(t)=A(t)\cos(2\pi f_c t+\varphi(t));$$

wherein A(t) is an amplitude modulation signal; $\varphi(t)$ is a phase modulation signal; and $f_c$ is carrier frequency. The emitted waves are digitally modulated and carry digital information in the form of floating-point number sequences.

These emitted waves will be reflected in the underwater environment, and the electromagnetic wave receiver on the sea-bottom crawler will capture these reflected waves, which can be expressed as:

$$r(t) = \sum_{i=1}^{N} a_i(t)s(t-\tau_i(t)) + n(t);$$

wherein N is the number of reflected wave paths; $a_i(t)$ is the complex amplitude attenuation coefficient of the i-th path; $\tau_i(t)$ is the time delay of the i-th path; and n(t) is noise.

Step S20 is implemented specifically as follows:

The captured reflected wave signals r(t) are demodulated and digitized to extract the digital information carried in the reflected waves. Specifically, the reflected wave signals are demodulated using the synchronous detection method to obtain demodulated digital information. Step S30 is implemented specifically as follows:

First, the time of the emitted wave s(t) and the reflected wave r(t) are aligned; for example, the time delay $\tau_i(t)$ of the reflected wave can be estimated by the least-square method, and then the emitted wave and the reflected wave are aligned.

Next, the feature parameters within each time window are calculated by using the sliding time window method. Specifically, if the time window length is $T_w$ and the sliding step size is $\Delta t$, then the feature parameters within the k-th time window include:

Time delay $\tau_k$:

$$\tau_k = \frac{1}{T_w} \int_{t_k}^{t_k+T_w} \tau_i(t)dt;$$

Amplitude attenuation $a_k$:

$$a_k = \frac{1}{T_w} \int_{t_k}^{t_k+T_w} a_i(t)dt;$$

Discrimination $d_k$:

$$d_k = 1 - \frac{\int_{t_k}^{t_k+T_w} s(t-\tau_k)r(t)dt}{\sqrt{\int_{t_k}^{t_k+T_w} s^2(t-\tau_k)dt \int_{t_k}^{t_k+T_w} r^2(t)dt}};$$

wherein $t_k=k\Delta t$. Discrimination $d_k$ is defined as subtracting the correlation coefficient between the reflected wave and the emitted wave within the sliding time window from 1, reflecting the similarity between the two.

Step S40 is implemented specifically as follows:

The information obtained in steps S10 to S30, including the emitted wave s(t), reflected wave r(t), as well as the time delay $\tau_k$, amplitude attenuation $a_k$, and discrimination $d_k$ of each time window, are input into a pre-trained first reflected wave compensation model. After processing by this model, a preliminary compensated reflected wave f (t) can be obtained, which is referred to as the first compensated reflected wave.

Step S50 is implemented specifically as follows:

The underwater environmental parameters (d, T, S) and pose information (x, y, z, $\phi$, $\psi$, $\theta$, $v_x$, $v_y$, $v_z$, $\omega_x$, $\omega_y$, $\omega_z$, $a_x$, $a_y$, $a_z$, $\alpha_x$, $\alpha_y$, $\alpha_z$) of the sea-bottom crawler obtained in step S10 are aligned with the emitted wave s(t) in step S10 to ensure time synchronization among various types of information.

Step S60 is implemented specifically as follows:

The correlation of the underwater environmental parameters (d, T, S) and the sea-bottom crawler's pose information ($\phi$, $\psi$, $\theta$, $v_x$, $v_y$, $v_z$, $\omega_x$, $\omega_y$, $\omega_z$, $a_x$, $a_y$, $a_z$, $\alpha_x$, $\alpha_y$, $\alpha_z$) with the time delay $\tau_k$, amplitude attenuation $a_k$, and discrimination $d_k$ of each time window is calculated by using the Bayesian network method.

Step S70 is implemented specifically as follows:

Mathematical models, namely interference equations, covering various interference factors such as water depth, water temperature, salinity, crawler pose, speed, and acceleration are established according to the correlation calculated in step S60 by using a series of preset relation functions.

Water Depth Interference Equation:

$$D_w = a_1 \cdot d + a_2 \cdot \frac{\partial d}{\partial t} + a_3 \cdot e^{-b_1 d} + a_4 \cdot \log(d+1) + \varepsilon_1;$$

wherein $D_w$ is the degree of interference of water depth on electromagnetic waves; d is water depth; t is time; $a_1$, $a_2$, $a_3$, $a_4$, $b_1$ are coefficients to be determined; $\varepsilon_1$ is the first error term. Water depth d is directly measured by a depth sensor, and $$\frac{\partial d}{\partial t}$$

is calculated from continuous depth measurements:

$$\frac{\partial d}{\partial t} = \lim_{\Delta t \to 0} \frac{d(t + \Delta t) - d(t)}{\Delta t};$$

Water Temperature Interference Equation:

$$D_T = b_1 \cdot T + b_2 \cdot \frac{\partial T}{\partial z} + b_3 \cdot \sin(\omega T) + b_4 \cdot T^2 + \varepsilon_2;$$

wherein $D_T$ is the degree of interference of water temperature on electromagnetic waves; T is water temperature; z is depth; $\omega$ is the angular frequency of periodic temperature variation; $b_1$, $b_2$, $b_3$, $b_4$ are coefficients to be determined; $\varepsilon_2$ is the second error term. Water temperature T is directly measured by a temperature sensor, and $$\frac{\partial T}{\partial z}$$

is calculated by measuring temperature at different depths:

$$\frac{\partial T}{\partial z} = \lim_{\Delta z \to 0} \frac{T(z + \Delta z) - T(z)}{\Delta z};$$

Salinity Interference Equation:

$$D_S = c_1 \cdot S + c_2 \cdot \frac{\partial S}{\partial x} + c_3 \cdot \frac{\partial S}{\partial y} + c_4 \cdot e^{i\theta S} + \varepsilon_3;$$

wherein $D_S$ is the degree of interference of salinity on electromagnetic waves; S is salinity; x, y are horizontal coordinates; i is the imaginary unit; $\theta$ is the phase factor; $c_1$, $c_2$, $c_3$, $c_4$ are coefficients to be determined; $\varepsilon_3$ is the third error term. Salinity S is directly measured by a salinity sensor, and $$\frac{\partial S}{\partial x}$$

and $$\frac{\partial S}{\partial y}$$

is calculated by measuring salinity at different horizontal positions:

$$\frac{\partial S}{\partial x} = \lim_{\Delta x \to 0} \frac{S(x + \Delta x, y) - S(x, y)}{\Delta x};$$

$$\frac{\partial S}{\partial y} = \lim_{\Delta y \to 0} \frac{S(x, y + \Delta y) - S(x, y)}{\Delta y};$$

Crawler Pitch Angle Interference Equation:

$$D_p = d_1 \cdot \tan(\phi) + d_2 \cdot \frac{d\phi}{dt} + d_3 \cdot |\phi|^{1.5} + d_4 \cdot \phi^3 + \varepsilon_4;$$

wherein $D_p$ is the degree of interference of pitch angle on electromagnetic waves; $\phi$ is the pitch angle; t is time; $d_1$, $d_2$, $d_3$, $d_4$ are coefficients to be determined; $\varepsilon_4$ is the fourth error term. Pitch angle $\phi$ is directly measured by the inertial measurement unit, and $$\frac{d\phi}{dt}$$

is calculated from continuous pitch angle measurements:

$$\frac{d\phi}{dt} = \lim_{\Delta t \to 0} \frac{\phi(t + \Delta t) - \phi(t)}{\Delta t};$$

Crawler Roll Angle Interference Equation:

$$D_r = e_1 \cdot \sin(\psi) + e_2 \cdot \frac{d\psi}{dt} + e_3 \cdot |\psi|;$$

Crawler Heading Angle Interference Equation:

$$D_h = f_1 \cdot \cos(\theta) + f_2 \cdot \frac{d\theta}{dt} + f_3 \cdot e^{i\theta} + f_4 \cdot \theta^2 + \varepsilon_6;$$

wherein $D_h$ is the degree of interference of heading angle on electromagnetic waves; $\theta$ is the heading angle; t is time; i is the imaginary unit; $f_1$, $f_2$, $f_3$, $f_4$ are coefficients to be determined; $\varepsilon_6$ is the sixth error term. Heading angle $\theta$ is directly measured by the inertial measurement unit, and $$\frac{d\theta}{dt}$$

is calculated from continuous heading angle measurements:

$$\frac{d\theta}{dt} = \lim_{\Delta t \to 0} \frac{\theta(t + \Delta t) - \theta(t)}{\Delta t};$$

Crawler Speed Interference Equation:

$$D_v = g_1 \cdot |v| + g_2 \cdot \frac{\partial v}{\partial t} + g_3 \cdot v^2 + g_4 \cdot \log(|v| + 1) + \varepsilon_7;$$

wherein $D_v$ is the degree of interference of speed on electromagnetic waves; v is the speed vector; t is time;

$g_1$, $g_2$, $g_3$, $g_4$ are coefficients to be determined; $\varepsilon_7$ is the seventh error term. Speed v is calculated by integrating the inertial measurement unit and GPS (if near the water surface), and $$\frac{\partial v}{\partial t}$$

is calculated from continuous speed measurements:

$$\frac{\partial v}{\partial t} = \lim_{\Delta t \to 0} \frac{v(t + \Delta t) - v(t)}{\Delta t};$$

Crawler Acceleration Interference Equation:

$$D_a = h_1 \cdot |a| + h_2 \cdot \frac{\partial a}{\partial t} + h_3 \cdot a^2 + h_4 \cdot \sqrt{|a|} + \varepsilon_8;$$

wherein $D_a$ is the degree of interference of acceleration on electromagnetic waves; a is the acceleration vector; t is time; $h_1$, $h_2$, $h_3$, $h_4$ are coefficients to be determined; $\varepsilon_8$ is the eighth error term. Acceleration a is directly measured by the inertial measurement unit, and $$\frac{\partial a}{\partial t}$$

is calculated from continuous acceleration measurements:

$$\frac{\partial a}{\partial t} = \lim_{\Delta t \to 0} \frac{a(t + \Delta t) - a(t)}{\Delta t};$$

The above interference equations cover a plurality of interference factors such as water depth, water temperature, salinity, crawler posture (pitch angle, roll angle, heading angle), speed, acceleration and the like. By establishing these mathematical models, it is possible to better analyze and quantify the impact of various interference factors on electromagnetic wave propagation.

Step S80 is implemented specifically as follows:

All the data obtained in steps S10-S70 are collected, including the time delay $\tau_k$, amplitude attenuation $a_k$, and discrimination $d_k$ of the sliding time window, as well as the underwater environmental parameters (d, T, S) and the pose information ($\phi$, $\psi$, $\theta$, $v_x$, $v_y$, $v_z$, $\omega_x$, $\omega_y$, $\omega_z$, $a_x$, $a_y$, $a_z$, $\alpha_x$, $\alpha_y$, $\alpha_z$) of the sea-bottom crawler.

According to the interference equations established in step S70, each interference factor is taken as the independent variable, and time delay $\tau_k$, amplitude attenuation $a_k$, and discrimination $d_k$ are taken as the dependent variables to construct a fitting matrix.

The least-square method is applied to solve this fitting matrix to preliminarily obtain the weight coefficient of each interference factor. Specifically, the loss function can be defined as follows:

$$L = \sum_{k=1}^{K} \left[ (\tau_k - \hat{\tau}_k)^2 + (a_k - \hat{a}_k)^2 + (d_k - \hat{d}_k)^2 \right];$$

wherein $\hat{\tau}_k$, $\hat{a}_k$, $\hat{d}_k$ are values predicted according to the interference equation. By minimizing the loss function L, it is possible to obtain preliminary weight coefficients for respective interfering factors.

To avoid overfitting, it is necessary to regularize the results of the least-square method. L1 regularization or L2 regularization may be used, and regularization term can be added to the loss function:

$$L = \sum_{k=1}^{K} \left[ (\tau_k - \hat{\tau}_k)^2 + (a_k - \hat{a}_k)^2 + (d_k - \hat{d}_k)^2 \right] + \lambda \sum_{i=1}^{M} |w_i|$$

or $$L = \sum_{k=1}^{K} \left[ (\tau_k - \hat{\tau}_k)^2 + (a_k - \hat{a}_k)^2 + (d_k - \hat{d}_k)^2 \right] + \lambda \sum_{i=1}^{M} w_i^2;$$

wherein $w_i$ is the weight coefficient of each interference factor, and $\lambda$ is the regularization parameter.

The optimal regularization parameter $\lambda$ is selected by using a k-fold cross-validation method, so that the performance of the model is optimal on the validation set.

Finally, all data is finally fitted by using the selected regularization parameter to obtain the weight coefficient of each interference factor.

In the end, the final weight coefficients of respective interference factors are output, including weight coefficients of water depth d, water temperature T, salinity S, crawler pitch angle $\phi$, roll angle $\psi$, heading angle $\theta$, speed ($v_x$, $v_y$, $v_z$, $\omega_x$, $\omega_y$, $\omega_z$), and acceleration ($a_x$, $a_y$, $a_z$, $\alpha_x$, $\alpha_y$, $\alpha_z$).

In general, the purpose of step S80 is to establish and fit the interference equations to obtain the degree of influence of various interference factors on electromagnetic wave propagation, providing important basis for subsequent reflected wave compensation. This involves multiple steps such as data collection, fitting matrix construction, least-square solution, regularization processing, cross-validation, and model evaluation.

Step S90 is implemented specifically as follows:

The first compensated reflected wave $\hat{r}(t)$ obtained in step S40, the weight coefficients of various interference factors obtained in step S80, and the underwater environment parameters (d, T, S) and pose information ($\phi$, $\psi$, $\theta$, $v_x$, $v_y$, $v_z$, $\omega_x$, $\omega_y$, $\omega_z$, $a_x$, $a_y$, $a_z$, $\alpha_x$, $\alpha_y$, $\alpha_z$) of the sea-bottom crawler obtained in step S10 are input together into a pre-trained second reflected wave compensation model.

After processing by the multi-branch neural network model, a final compensated reflected wave $r_f(t)$ can be obtained as the result of electromagnetic detection. This model comprehensively considers the influence of underwater environmental parameters and crawler pose information on reflected waves, and further optimizes the preliminary compensation results to better suppress various interference factors and improve the accuracy of electromagnetic detection.

In order to further better understand and implement the present invention, Example 3, which demonstrates a specific application scenario of the present invention, is provided below:

A certain marine geological exploration institution has decided to use the electromagnetic detection method based on sea-bottom crawlers provided in the present invention to conduct underwater resource exploration in a certain sea area of the South China Sea. In this sea area, the water depth is around 3000 meters; the water temperature varies in the range of 4-8° C.; the salinity is between 34-36‰; and the geological structure is relatively complex. In order to obtain detailed geological information of this sea area, the institution deployed a sea-bottom crawler and carried out relevant modifications and integration on the equipment.

1. Equipment Integration of the Sea-Bottom Crawler

The main parameters and integrated sensor equipment of the sea-bottom crawler are shown in the table below:

TABLE 1

Main parameters and integrated sensors of the sea-bottom crawler

| Parameter/equipment | Value/model |
|---|---|
| Dimensions | Length 5 meters, width 3 meters, height 2 meters |
| Mass | 2 tons |
| Maximum crawling speed | 2 knots |
| Working depth | 6000 meters |
| Electromagnetic wave transmitter | Center frequency 500 kHz, bandwidth 50 kHz |
| Electromagnetic wave receiver | 12 channels |
| Depth sensor | Aanderaa 3719, measuring range 0-6000 meters, accuracy 0.1% |
| Temperature sensor | Seabird SBE38, measuring range −5~35° C., accuracy 0.002° C. |
| Salinity sensor | Seabird SBE4, measuring range 0-42 psu, accuracy 0.0003 psu |
| Inertial measurement unit | LORD Microstrain 3DM-GX5-25, measurement range ±16 g/±2000°/s, accuracy 0.05° |
| GPS receiver | Trimble BD982, horizontal positioning accuracy 0.6 m, vertical accuracy 1.2 m |

This sea-bottom crawler is driven by wheels and is provided with 6 independent drive wheels, which can move easily in complex underwater terrain. The crawler is provided with a self-developed electromagnetic wave transmitter and receiver, operating at a frequency of 500 kHz, capable of transmitting and receiving digitally modulated electromagnetic wave signals. At the same time, the crawler is provided with a depth sensor, a temperature sensor, a salinity sensor, an inertial measurement unit, and a GPS receiver, which can collect real-time underwater environmental parameters and its own pose information. These sensor data will provide a basis for subsequent interference compensation. 2. Implementation process of sea-bottom exploration The institution had set up a 100 km×100 km exploration area in a certain sea area of the South China Sea and conducted detailed sea-bottom terrain mapping of the area, providing a basis for the path planning of the crawler. Before officially starting the exploration, a staff member conducted tentative measurement on a plurality of representative points in the area, collecting preliminary environmental parameters and electromagnetic wave reflection data to lay a foundation for training the compensation model.

After entering the formal detection stage, the sea-bottom crawler first slowly travelled along the predetermined path, while recording real-time dynamic information such as its position, posture, speed, and acceleration. During the crawling process, the crawler periodically emitted electromagnetic waves and received reflected wave signals. At the same time, the supporting environmental sensors also continued to collect parameters such as water depth, water temperature, and salinity. These real-time measurement data serve as inputs for subsequent interference analysis and compensation.

In order to ensure the time synchronization of data, all sensing devices on the crawler are uniformly connected to a central control unit and time calibrated through GPS. Every 5 seconds, the control unit records data from all sensors to form a time series. The following is a partial data collected by the crawler during an actual detection:

TABLE 2

Partial data collected in real-time by the sea-bottom crawler

| Timestamp | Depth (m) | Temp. (° C.) | Salinity (psu) | Position (x, y, z) | Posture (φ, ψ, θ) | Speed (vx, vy, vz, ωx, ωy, ωz) | Acceleration (ax, ay, az, αx, αy, αz) | Emitted waves | Reflected waves |
|---|---|---|---|---|---|---|---|---|---|
| 2022 Aug. 1 10:00:00 | 2987.4 | 15.2 | 34.6 | (12345.6, 54321.2, 2987.4) | (2.3°, −1.5°, 12.4°) | (0.5,0.3, −0.1,0.2, 0.1, −0.3) | (0.01, −0.02, 0.03, 0.002, 0.001, −0.005) | $s_1(t)$ | $r_1(t)$ |
| 2022 Aug. 1 10:00:05 | 2988.1 | 5.3 | 34.7 | (12345.9, 54321.4, 2988.1) | (2.4°, −1.4°, 12.5°) | (0.6,0.3, −0.1,0.2, 0.1, −0.3) | (0.01, −0.02, 0.03, 0.002, 0.001, −0.005) | $s_2(t)$ | $r_2(t)$ |
| ... | ... | ... | ... | ... | ... | ... | ... | ... | ... |

By high-frequency sampling every 5 seconds, the crawler recorded approximately 72000 time-series data points throughout the entire detection process. These data provide sufficient samples for subsequent interference analysis and reflection wave compensation.

3. Interference Analysis and Compensation

With the real-time collected environmental parameters and crawler pose data mentioned above, various interference factors during the propagation of electromagnetic waves can be analyzed and modeled. The specific steps are as follows:

(1) Sliding Window Feature Extraction

First, the time of the emitted wave s(t) and the reflected wave r(t) are aligned; then the time delay $\tau_k$, amplitude attenuation $a_k$, and discrimination $d_k$ between the reflected wave and the emitted wave within each time window are calculated by using the sliding time window method. These parameters can reflect the influence of various interference factors on reflected waves. The following are feature parameters of several time windows:

TABLE 3

Reflected wave feature parameters of several time windows

| Time window | Time delay $\tau_k$(ms) | Amplitude attenuation $a_k$ | Discrimination $d_k$ |
|---|---|---|---|
| 1 | 12.34 | 0.67 | 0.23 |
| 2 | 12.41 | 0.65 | 0.26 |
| 3 | 12.38 | 0.68 | 0.24 |
| ... | ... | ... | ... |

(2) Modeling of Interference Factors

Based on the feature parameters extracted in step (1) and the real-time environmental parameters and pose information collected in step 2, mathematical models, namely interference equations, covering various interference factors, can be established.

For example, the water depth interference equation described above is:

$$D_w = a_1 \cdot d + a_2 \cdot \frac{\partial d}{\partial t} + a_3 \cdot e^{-b_1 d} + a_4 \cdot \log(d+1) + \varepsilon_1$$

By substituting the measured water depth data and using the least-square method for fitting, the following is obtained:

$$D_w = 0.21 \cdot d + 0.15 \cdot \frac{\partial d}{\partial t} + 0.02 \cdot e^{-0.0003d} + 0.04 \cdot \log(d+1) + \varepsilon_1$$

wherein $\varepsilon_1$ is a random error term.

Similarly, water temperature interference equation, salinity interference equation, and interference equations for crawler posture, speed and acceleration are established. These model parameters will provide a basis for subsequent reflection wave compensation. (3) Multi-level compensation Based on the above interference analysis, a two-level neural network model was adopted to compensate for the reflected waves.

The first level is a reflected wave compensation model with a multi-subnet structure. The model includes a feature extraction module, a long-term feature sub-network, a window feature sub-network, an abnormal feature sub-network, and a fusion output sub-network. By working together, these sub-networks can capture the reflected wave's long-term trend, features within a local time window and abnormal patterns, and generate a preliminary compensation result. The second layer is a multi-branch reflected wave compensation model. The model includes an environmental parameter branch network, a pose information branch network, a compensated reflected wave branch network, and a fusion branch network. The environmental parameter branch network and the pose information branch network are used to separately process the impact of environmental parameters and pose information on reflected waves. The compensated reflected wave branch network further optimizes the preliminary compensation result, and the fusion branch network integrates the outputs of each branch to generate the final compensation results.

By this multi-level compensation mechanism, real-time measured environmental parameters and pose information can be fully utilized to effectively suppress the influence of various interference factors on electromagnetic detection results.

4. Experimental Results and Analysis

Based on the steps implemented above, a one-week electromagnetic detection experiment was conducted in a certain sea area of the South China Sea. During the exploration process, the sea-bottom crawler traveled a total of 20 km and collected a large amount of environmental parameters, pose information, as well as electromagnetic wave emission and reflection data.

In order to verify the performance of the method of the present invention, several typical geological structure points in the sea area were selected, and the detection results obtained by using the method of the present invention and conventional methods (without considering interference factors) were compared and analyzed. The following is the detection result at one representative location:

TABLE 4

Comparison of detection results using different methods

| Location coordinates | Conventional method | Inventive method |
|---|---|---|
| (12345.7, 54321.5, 2986.3) | Sedimentary layer thickness: 150 m Indirect evidence: none | Sedimentary layer thickness: 180 m Indirect evidence: signs of oil and gas |

From Table 4, it can be seen that the thickness of the sedimentary layer obtained by the method of the present invention is 30 meters higher than that of the conventional method, and signs of oil and gas have been found, which complies with the geological structure characteristics of the sea area. Further analysis shows that the method of the present invention can effectively suppress the influence of interference factors such as water depth, water temperature, salinity, and changes in crawler posture, and the detection results are more accurate and reliable.

In order to comprehensively evaluate the performance of the method of the present invention, 20 representative locations were selected throughout the detection area; and comparative analysis were carried out using conventional method and the method of the present invention. The results show that compared with the conventional method, the detection accuracy of the method of the present invention has been improved by an average of 23.7%. At the same time, the method of the present invention can better identify the sea-bottom lithology, structure characteristics, and resource indications, providing a more reliable basis for subsequent marine geological exploration work.

The above is only specific embodiments of the present invention, but the scope of protection of the present invention is not limited to this. Any skilled person familiar with this technical field can easily think of changes or substitutions within the technical scope disclosed in the present invention, which should be included in the scope of protection of the present invention.

What is claimed is:

1. An electromagnetic detection system based on a sea-bottom crawler, comprising: a survey vessel, a sea-bottom crawler, a transmitting antenna, a receiving node array, a control chip, and a power supply; wherein the survey vessel is connected to the sea-bottom crawler through a traction rope, and a tail of the sea-bottom crawler is provided with a drag cable, and on the drag cable, the transmitting antenna and the receiving node array are mounted, and both the control chip and the power supply are configured in an integrated electronic cabin of the sea-bottom crawler; wherein the power supply provides electrical energy to the sea-bottom crawler, the transmitting antenna, the receiving node array, and the control chip, and the control chip is electrically connected to the transmitting antenna, the receiving node array, and a power system of the sea-bottom crawler; wherein an electromagnetic detection interference compensation device for performing interference elimination and compensation on reflected waves received by the receiving node array is performed by the control chip; wherein the control chip is configured to have a data transmission device for sending compensated electromagnetic detection results to the survey vessel; wherein the electromagnetic detection interference compensation device specifically implements following steps:

S10, controlling the sea-bottom crawler to crawl within a predetermined detection area, obtaining underwater environmental parameters and pose information of the sea-bottom crawler, while emitting electromagnetic waves and receiving the reflected waves, the underwater environmental parameters including water depth, water temperature and salinity; wherein emitted waves are modulated and carry digital information, which are referred to as the emitted waves;

S20, demodulating and digitizing captured reflected wave signal to obtain demodulated digital information;

S30, aligning time of the emitted waves and the reflected wave according to the demodulated digital information, and calculating a time delay, amplitude attenuation, and discrimination between the reflected wave and the emitted waves within each time window by using a sliding time window method, wherein the discrimination is defined as 1 minus a similarity between the reflected wave and the emitted waves within the sliding time window;

S40, inputting the emitted waves, the reflected wave, as well as the time delay, the amplitude attenuation, and the discrimination of each time window into a pre-trained first reflected wave compensation model to obtain a first compensated reflected wave;

S50, aligning the underwater environmental parameters and the pose information of the sea-bottom crawler with the emitted waves according to time window;

S60, calculating a correlation of the underwater environmental parameters and sea-bottom crawler pose information with the time delay, the amplitude attenuation, and the discrimination of each time window by using Bayesian network method;

S70, establishing interference equations by using preset relation functions according to the correlation obtained by calculation, including water depth interference equation, water temperature interference equation, salinity interference equation, crawler pitch angle interference equation, crawler roll angle interference equation, crawler heading angle interference equation, crawler speed interference equation, and crawler acceleration interference equation;

S80, fitting and calculating a weight coefficients of respective interference factors for the interference equations, wherein the respective interference factors include the underwater environmental parameters and the pose information of the sea-bottom crawler;

S90, inputting the first compensated reflected wave, the weight coefficients of respective interference factors, and the underwater environmental parameters and the pose information of the sea-bottom crawler into a pre-trained second reflected wave compensation model to obtain a final compensated reflected wave as a result of electromagnetic detection;

wherein the sea-bottom crawler therein adopts a tracked sea-bottom crawler;

wherein the data transmission device sends the compensated electromagnetic detection results to the survey vessel through a data cable or wireless channel;

wherein the receiving node array is specifically a linear or two-dimensional array composed of multiple electromagnetic induction coils, and each receiving node comprises three-axis orthogonal induction coils for receiving electromagnetic field signals from different directions.

2. The electromagnetic detection system based on the sea-bottom crawler according to claim 1, wherein the transmitting antenna is a negative buoyancy antenna.

3. The electromagnetic detection system based on the sea-bottom crawler according to claim 2, wherein a module of the sea-bottom crawler comprises at least a depth gauge and an altimeter.

4. The electromagnetic detection system based on the sea-bottom crawler according to claim 3, further comprising an excitation source, which is attached to the sea-bottom crawler.

5. The electromagnetic detection system based on the sea-bottom crawler according to claim 4, wherein the excitation source is specifically a dipole emitter composed of a pair of large-area electrode plates, and generate low-frequency alternating current to excite an electromagnetic field in underwater medium.

6. The electromagnetic detection system based on the sea-bottom crawler according to claim 5, wherein the survey vessel is provided with a satellite navigation system, an underwater positioning system, and the power supply.

* * * * *